US012038776B2

(12) United States Patent
Wehlmann et al.

(10) Patent No.: US 12,038,776 B2
(45) Date of Patent: Jul. 16, 2024

(54) DEVICES AND METHODS RELATED TO JOYSTICKS

(71) Applicant: BOURNS, INC., Riverside, CA (US)

(72) Inventors: Perry Wehlmann, Corona, CA (US); Eugen Bogos, Lake Elsinore, CA (US); Brandon Council, Riverside, CA (US)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 17/903,855

(22) Filed: Sep. 6, 2022

(65) Prior Publication Data

US 2022/0413542 A1 Dec. 29, 2022

Related U.S. Application Data

(63) Continuation of application No. 16/288,585, filed on Feb. 28, 2019, now Pat. No. 11,474,553.

(60) Provisional application No. 62/636,822, filed on Feb. 28, 2018.

(51) Int. Cl.
*G05G 9/047* (2006.01)
*G05G 5/05* (2006.01)

(52) U.S. Cl.
CPC ............... *G05G 9/047* (2013.01); *G05G 5/05* (2013.01); *G05G 2009/04703* (2013.01); *G05G 2009/04711* (2013.01); *G05G 2009/04755* (2013.01)

(58) Field of Classification Search
CPC .......... G05G 2009/04703; G05G 2009/04711; G05G 2009/04755
See application file for complete search history.

(56) References Cited

U.S. PATENT DOCUMENTS

| | | | | |
|---|---|---|---|---|
| 4,489,303 | A * | 12/1984 | Martin | H03K 17/97 74/543 |
| 6,078,247 | A | 6/2000 | Shimomura | |
| 6,344,620 | B1 | 2/2002 | Nakamura | |
| 6,606,085 | B1 | 8/2003 | Endo et al. | |
| 9,898,033 | B1 | 2/2018 | Long | |

(Continued)

FOREIGN PATENT DOCUMENTS

| | | | |
|---|---|---|---|
| CN | 102857214 | A | 1/2013 |
| DE | 10 2006 042725 | A1 | 3/2008 |

(Continued)

OTHER PUBLICATIONS

International Search Report dated Jul. 11, 2019 for PCT/US2019/019975.
Written Opinion dated Jul. 11, 2019 for PCT/US2019/019975.

*Primary Examiner* — Vicky A Johnson
(74) *Attorney, Agent, or Firm* — Chang & Hale LLP

(57) ABSTRACT

A control input device can include a housing defining an inner volume with a floor, and a shaft having an axis, a manipulating portion, and a sensing end. The control input device can further include a magnet mounted on the sensing end of the shaft such that the magnet is within the inner volume of the housing, and a movement mechanism configured to allow the manipulating portion of the shaft to be moved with respect to the housing such that the movement of the manipulating portion results in corresponding movement of the magnet. The control input device can further include a magnetic sensor at least partially embedded in the floor of the housing and configured to sense the movement of the magnet.

18 Claims, 9 Drawing Sheets

(56) References Cited

U.S. PATENT DOCUMENTS

| | | | | |
|---|---|---|---|---|
| 11,474,553 | B2 * | 10/2022 | Wehlmann ............. | G05G 9/047 |
| 2002/0005833 | A1 | 1/2002 | Furukawa et al. | |
| 2005/0068134 | A1 | 3/2005 | Nishino et al. | |
| 2007/0262959 | A1 * | 11/2007 | Gu ......................... | G05G 9/047<br>345/161 |
| 2010/0265176 | A1 | 10/2010 | Olsson et al. | |
| 2016/0370821 | A1 | 12/2016 | Randle | |

FOREIGN PATENT DOCUMENTS

| | | | |
|---|---|---|---|
| DE | 10 2015 102 317 | A1 | 8/2016 |
| EP | 1 146 530 | A1 | 10/2001 |
| EP | 2 204 719 | A1 | 7/2010 |
| EP | 2219094 | A2 | 8/2010 |
| JP | 11-353109 | A | 12/1999 |
| JP | 2001-051739 | A | 2/2001 |
| JP | 2001-056744 | A | 2/2001 |
| JP | 2001-159953 | A | 6/2001 |
| JP | 2011-154596 | A | 8/2011 |
| WO | 2008031725 | A1 | 3/2008 |

* cited by examiner

DEVICES AND METHODS RELATED TO JOYSTICKS

CROSS-REFERENCE TO RELATED APPLICATION(S)

This application is a continuation of U.S. application Ser. No. 16/288,585 filed Feb. 28, 2019, entitled NON-CONTACT HALL-EFFECT JOYSTICK, which claims priority to and the benefit of the filing date of U.S. Provisional Application No. 62/636,822 filed Feb. 28, 2018, entitled NON-CONTACT HALL-EFFECT JOYSTICK, the benefits of the filing dates of which are hereby claimed and the disclosures of which are hereby expressly incorporated by reference herein in their entirety.

BACKGROUND

Field

The present disclosure relates to control devices such as joysticks.

Description of the Related Art

In many control applications, a device such as a joystick can allow a user's control movements to be transformed into control signals. Such control signals can then be utilized to generate effects corresponding to the control movements. Examples of such control applications can include user inputs associated with, gaming, machine control, vehicle control, etc.

SUMMARY

In some implementations, the present disclosure relates to a joystick device that includes a housing defining an inner volume with a floor, a pivot cover having an opening and positioned over the inner volume of the housing, and a spring having a first end positioned on the floor and configured to provide a spring force at a second end towards the pivot cover. The joystick device further includes a ball-shaft assembly having a ball with a first portion, a second portion, and a third portion. The first portion is attached to a shaft such that the first portion of the ball extends out of the pivot cover, the second portion of the ball movably engages the pivot cover, and the third portion receives the spring force, such that the ball is captured by the pivot cover and the spring while allowing a motion of the shaft. The joystick device further includes a magnet positioned at least partially in the third portion of the ball so as to move with the ball when the shaft moves. The joystick device further includes a sensor positioned relative to the magnet and configured to sense the motion of the magnet associated with the motion of the shaft.

In some embodiments, the joystick device can further include a cover structure that covers at least a portion of the housing. In some embodiments, the cover structure and the pivot cover can be formed as a single piece.

In some embodiments, at least the second portion of the ball can have a spherical shape. The opening of the pivot cover can have a circular shape, and the third portion of the ball can define a recess dimensioned to receive the magnet.

In some embodiments, the joystick device can further include a spring carrier having a first side and a second side, with the first side being configured to engage either or both of the magnet and the third portion of the ball, and the second side being configured to capture the second end of the spring such that the force provided by the spring is transferred to the ball through the spring carrier. In some embodiments, the magnet can have a disc shape, and the recess of the third portion of the ball can have a depth dimension such that both of the magnet and the third portion of the ball engage the first side of the spring carrier. In some embodiments, the spring can be a coil spring. In some embodiments, the second side of the spring carrier can include a groove dimensioned to capture the second end of the spring.

In some embodiments, the joystick device can further include a dome structure implemented between the spring carrier and the floor of the housing, and configured to deform and provide a click noise and/or feel when the shaft is pushed towards the floor of the housing. The spring carrier can include a bump structure implemented on its second side to facilitate the deformation of the dome structure.

In some embodiments, the sensor can be at least partially embedded in the floor of the housing. The motion of the shaft can be in a direction having one or more components parallel with an X direction, a Y direction, and a Z direction, with the Z direction being parallel with a longitudinal axis of the shaft, and the X, Y and Z directions being orthogonal with respect to each other.

In some embodiments, the motion of the shaft can include a rotation of the shaft about a longitudinal axis of the shaft. The magnet can be configured as a diametrically-magnetized disc magnet.

In some embodiments, the sensor can include multiple Hall-effect sensing elements arranged to sense the motion of the magnet. The magnet and the sensor can be in non-contacting arrangement. The sensor can be implemented such that the spring is between the sensor and the magnet.

In some implementations, the present disclosure relates to a user input system having a joystick that includes a housing defining an inner volume with a floor, a pivot cover having an opening and positioned over the inner volume of the housing, and a spring having a first end positioned on the floor and configured to provide a spring force at a second end towards the pivot cover. The joystick further includes a ball-shaft assembly having a ball with a first portion, a second portion, and a third portion, with the first portion being attached to a shaft such that the first portion of the ball extends out of the pivot cover, the second portion of the ball movably engaging the pivot cover, and the third portion receiving the spring force, such that the ball is captured by the pivot cover and the spring while allowing a motion of the shaft. The joystick further includes a magnet positioned at least partially in the third portion of the ball so as to move with the ball when the shaft moves, and a sensor positioned relative to the magnet and configured to sense the motion of the magnet associated with the motion of the shaft. The user input system further includes an electronic circuit configured to generate an output signal representative of the motion of the shaft based on the sensed motion of the magnet.

In some implementations, the present disclosure relates to a control input device that includes a shaft having an axis, a manipulating portion, and a sensing end. The control input device further includes a magnet mounted on the sensing end of the shaft, and a movement mechanism configured to allow the manipulating portion of the shaft to be moved in three dimensions with respect to the axis of the shaft. The movement of the manipulating portion results in corresponding movement of the magnet. The control input device further includes a magnetic sensor positioned relative to the magnet and configured to sense the motion of the magnet in a non-contact manner.

In some embodiments, the movement mechanism can be further configured to allow the manipulating portion of the shaft to be rotated about the axis.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1:
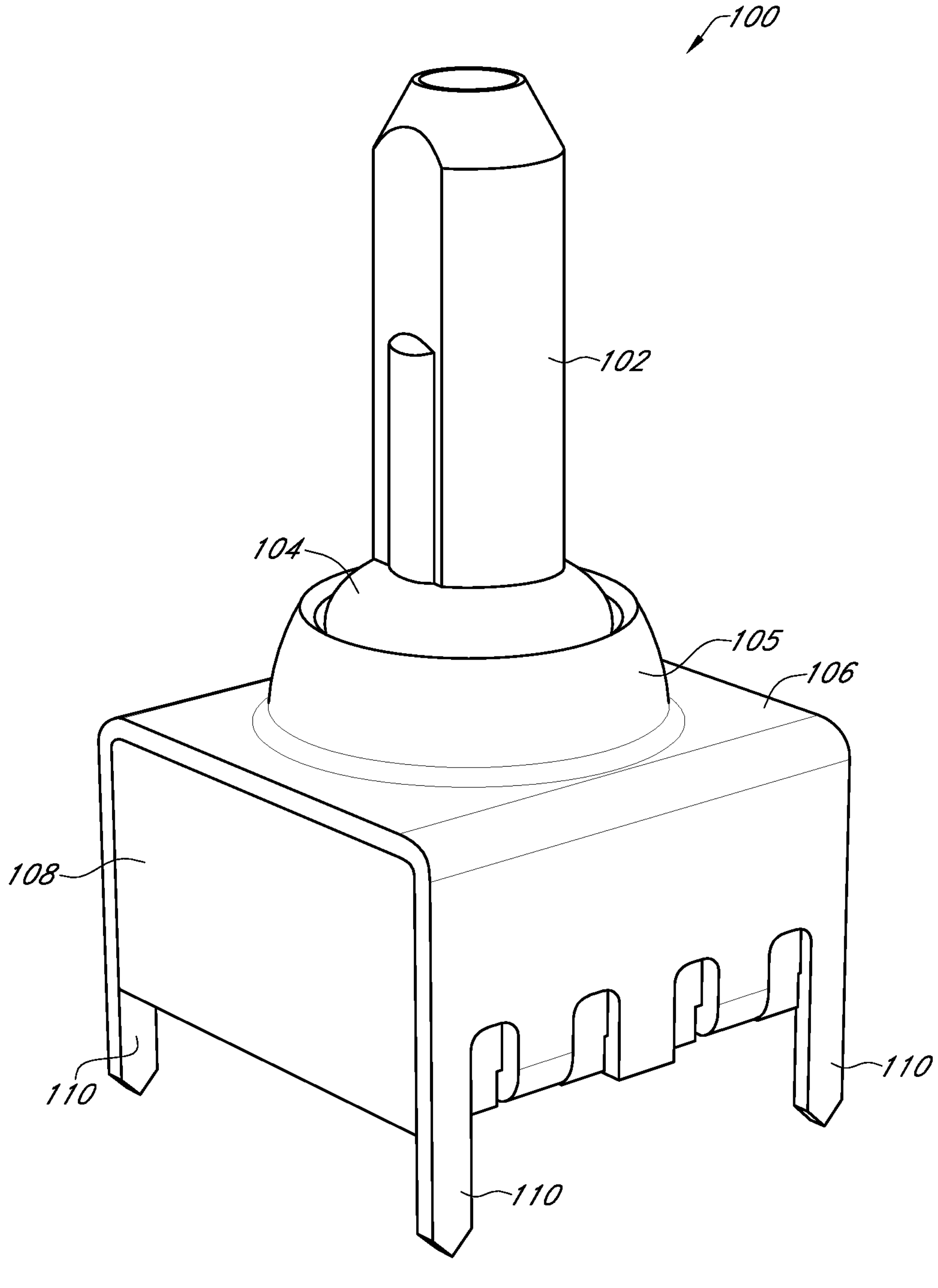
FIG. 1 shows a perspective view of an example joystick device.
Figure 2:
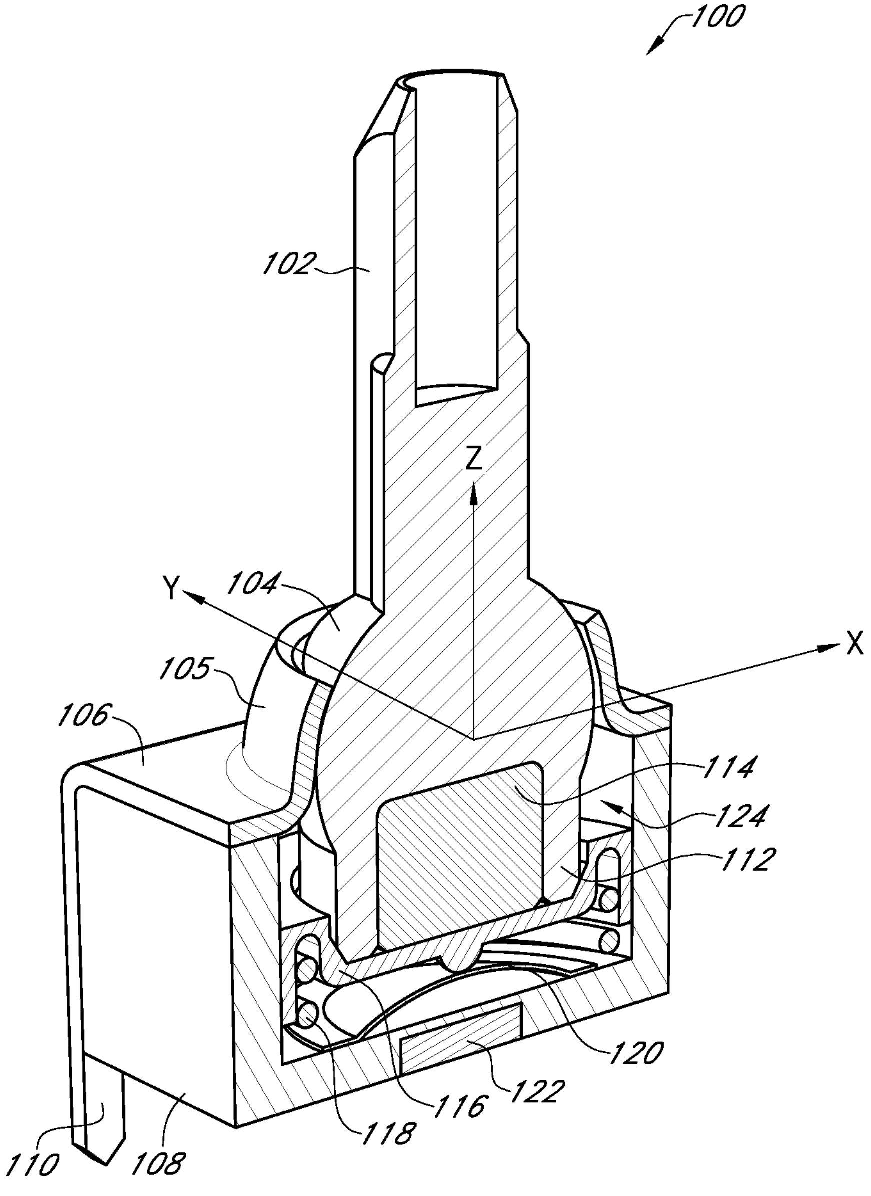
FIG. 2 shows a cutaway view of the example joystick device of FIG. 1.

FIG. 1 shows a perspective view of a joystick device 100, and FIG. 2 shows a cutaway view of the same joystick device. In some embodiments, such a joystick can include a shaft 102 attached to a ball 104, such that the ball 104 can be rotated with the shaft 102 while being retained by a pivot cover 105. The pivot cover 105 can define an opening (e.g., circular opening) to accommodate pivoting motions of the shaft/ball assembly. The inner surface of the pivot cover 105 can generally mate with the curvature of the ball 104 to provide the foregoing retaining and pivoting functionalities.

In the example of FIGS. 1 and 2, the pivot cover 105 can be a part of a cover structure 106 that partially or fully wraps around a housing 108. Such an assembly of pivot cover 105 and the cover structure 106 can be implemented as a single piece (e.g., formed or stamped from metal sheet), or be assembled from separate pieces. In some embodiments, the cover structure 106 can include a plurality of mounting features 110 configured to allow mounting of the joystick device 100 on a platform structure, circuit board, etc.

Referring to the cutaway view of FIG. 2, the housing 108 is shown to define an inner volume 124 dimensioned to accommodate a portion of the ball 104, a magnet holder 112 with a magnet 114 therein, a spring carrier 116, and a spring 118. In the example of FIG. 2, the inner volume 124 can have a rectangular (e.g., a square) shaped footprint, and each of the spring carrier 116 and the spring 118 can have a circular shaped footprint. For example, and assuming that the inner volume 124 has a square shaped footprint, the spring carrier 116 can have a circular shape having a diameter that is approximately equal to, or slightly less than, the side dimension of the square.

In some embodiments, the inner volume 124 can have a round (e.g., circular) shaped footprint, and each of the spring carrier 116 and the spring 118 can have a circular shaped footprint. For example, the spring carrier 116 can have a circular shape having a diameter that is approximately equal to, or slightly less than, the diameter of the circular shaped footprint of the inner volume 1124.

Referring to the cutaway view of FIG. 2, the spring 118 can be a coil spring configured to have one end rest on a floor of the inner volume 124, and the other end received into a circular groove on the corresponding side of the spring carrier 116. Accordingly, the spring 118 pushes the spring carrier 116 against the assembly of the magnet 114 and the magnet holder 112. In turn, the assembly of the magnet 114 and the magnet holder 112 pushes the ball 104 against the inner side of the pivot cover 105, thereby allowing the shaft/ball assembly to be retained in a spring loaded manner while allowing pivoting motions of the shaft/ball assembly. As described herein, such pivoting motions can provide joystick control functionalities in X and Y directions. Examples of such X and Y control functionalities are described herein in greater detail.

As described herein, the foregoing configuration of the joystick device 100 can also allow the shaft/ball assembly to be moved along the Z direction. For example, if the shaft 102 is pushed towards the floor of the housing 108, the shaft/ball assembly and the magnet 114 move toward the floor. If the pushing force is removed or reduced to a level less than the restorative force of the spring 118, the shaft/ball assembly and the magnet 114 move away from the floor until the ball 104 engages the inner side of the pivot cover 105. An example of such a Z control functionality is described herein in greater detail.

As described herein, the foregoing configuration of the joystick device 100 can also allow the shaft/ball assembly to be rotated. For example, the shaft 102 can be rotated about the axis of the shaft 102, and such a rotation can be facilitated by the engagement of the ball 104 and the pivot cover 105. In some embodiments, the engagement between the magnet (114)/holder (112) assembly and the spring carrier 116 can be configured (e.g., allow relative movement between engaging surfaces) to allow the foregoing rotation of the shaft/ball assembly. In some embodiments, the engagement between the spring 118 and the floor of the inner volume 124 can be configured (e.g., allow relative movement between engaging surfaces) to allow the foregoing rotation of the shaft/ball assembly, even if the engagement between the magnet (114)/holder (112) assembly and the spring carrier 116 does not provide such relative movement between engaging surfaces. An example of such a rotational control functionality is described herein in greater detail.

Referring to the cutaway view of FIG. 2, the joystick device 100 can further include a sensor 122 implemented as, for example, an application-specific integrated circuit (ASIC). Such a sensor can be positioned along the Z axis (e.g., embedded at least partially within the housing 108), and be configured to provide magnetic sensing functionalities associated with the foregoing X, Y, Z and rotational motions of the shaft/ball assembly and the magnet 114. As described herein, such magnetic sensing functionalities can be achieved in non-contact manners. Examples related to such a sensor are described herein in greater detail.

FIG. 2 shows that in some embodiments, the joystick device 100 can include a deformable dome structure 120 implemented between the spring carrier 116 and the floor of the housing 108. Such a dome structure can be configured to deform and provide a clicking noise and/or feel when the shaft/ball assembly is pushed in a direction having a component parallel to the Z axis. It will be understood that such a clicking functionality may or may not be implemented in a joystick device having one or more features as described herein.

Figure 3:
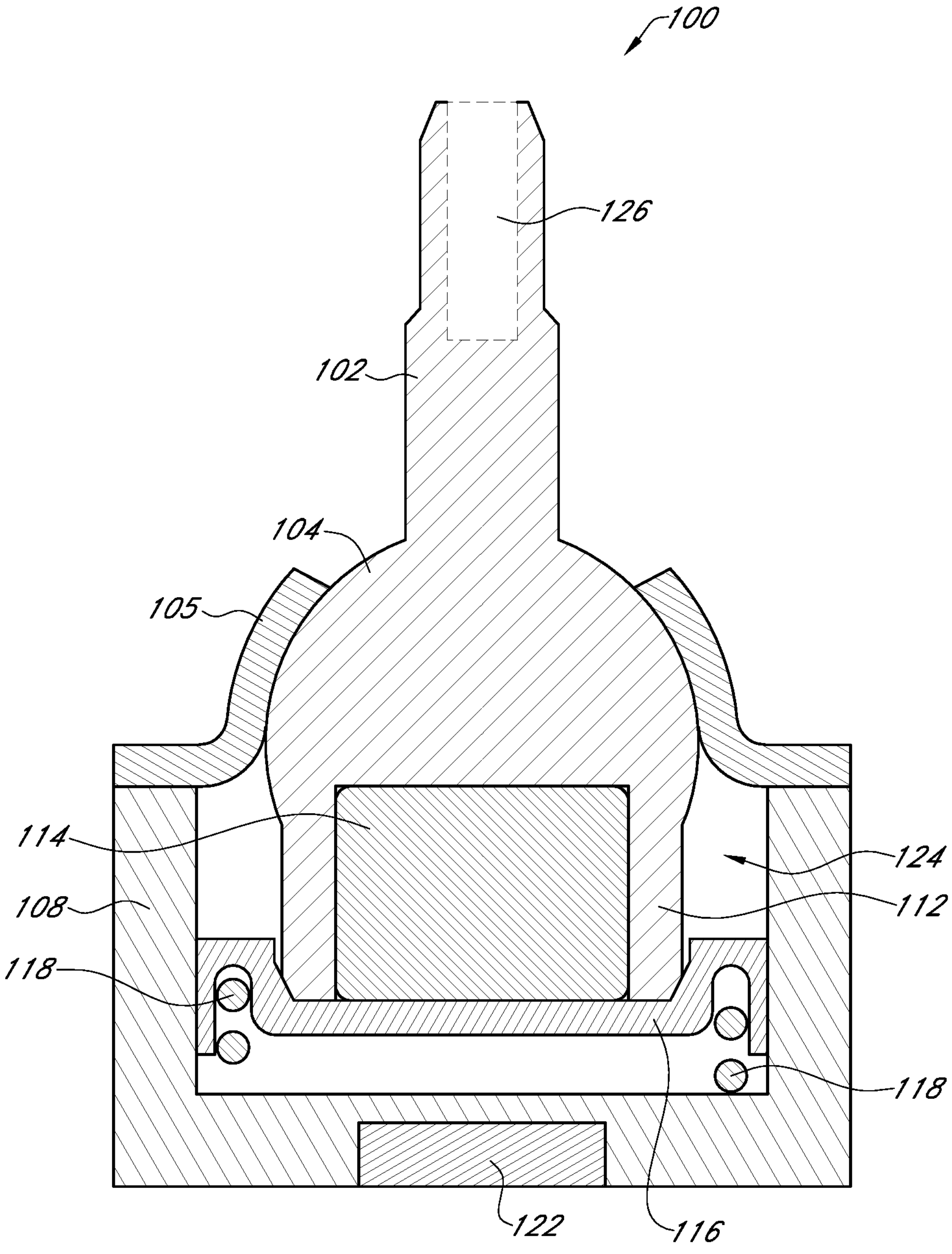
FIG. 3 shows a side sectional view of a joystick device that is similar to the example of FIG. 2, but without a dome structure.
Figure 4:
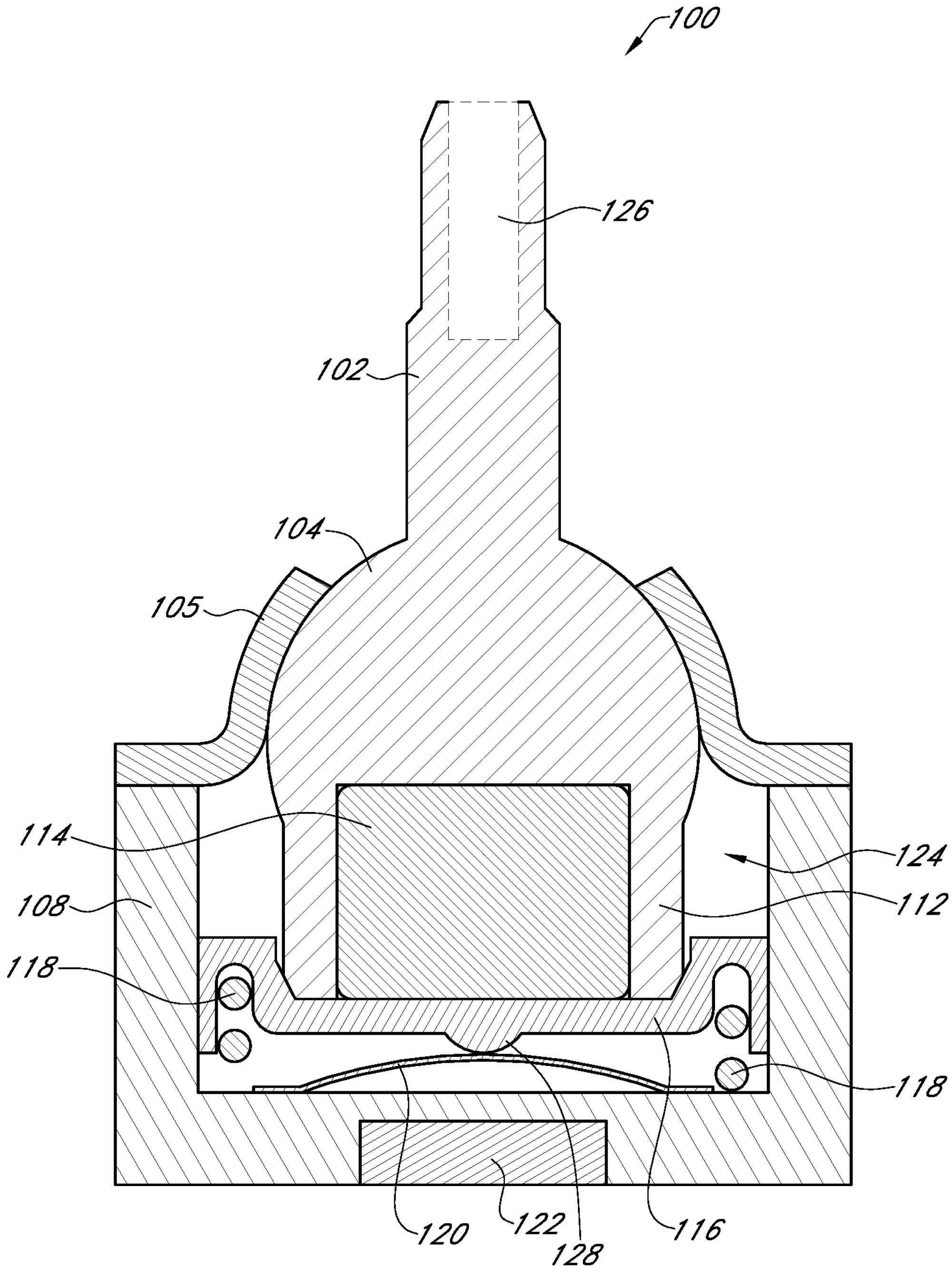
FIG. 4 shows a side sectional view of a joystick device that is similar to the example of FIG. 2.

For example, FIGS. 3 and 4 show side sectional views of respective joystick devices 100, where the joystick device 100 of FIG. 3 does not include a dome structure, and the joystick device 100 of FIG. 4 includes a dome structure 120. FIGS. 5-8 show examples of various joystick motions in the context of the joystick device 100 of FIG. 4 (with the dome structure 120); however, it will be understood that similar joystick motions can be performed with the joystick device 100 of FIG. 3 (without the dome structure).

FIG. 3 shows a side sectional view of a joystick device 100 that is similar to the example of FIG. 2, but without a dome structure (120 in FIG. 2). FIG. 4 shows a side sectional view of a joystick device 100 that is essentially the same as the example of FIG. 2. Accordingly, most of the various parts associated with FIGS. 3 and 4 are described above in reference to FIG. 2.

Referring to the example of FIG. 4, it is noted that in some embodiments, a bump structure 128 can be provided on a surface of the spring carrier 116. Such a bump structure can be dimensioned and positioned relative to the dome structure 120 so as to facilitate deformation of the dome structure 120. An example of such a deformation of the dome structure 120 is described herein in greater detail.

Figure 5:
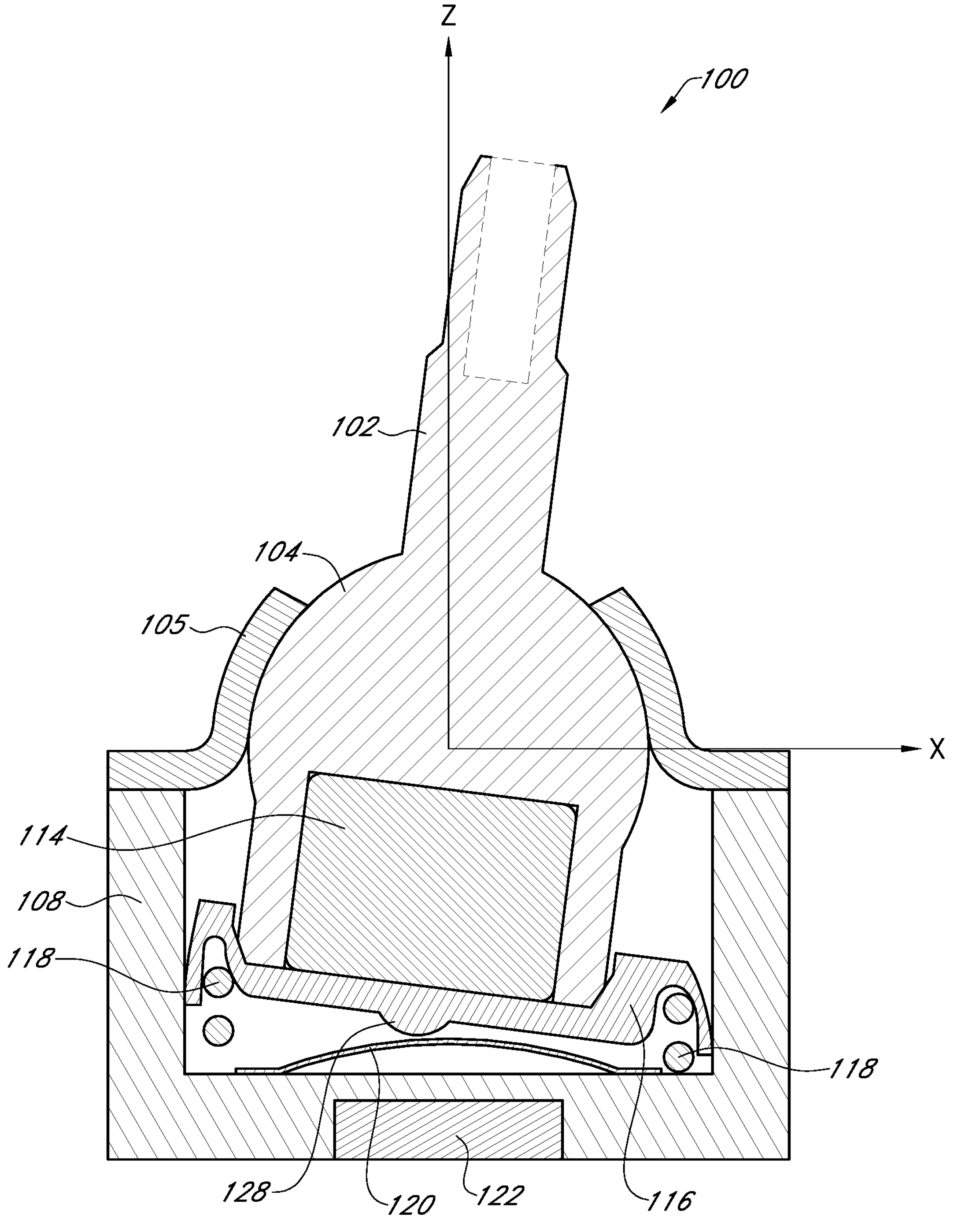
FIG. 5 shows an example joystick operation where a joystick shaft is pushed along an X direction.
Figure 6:
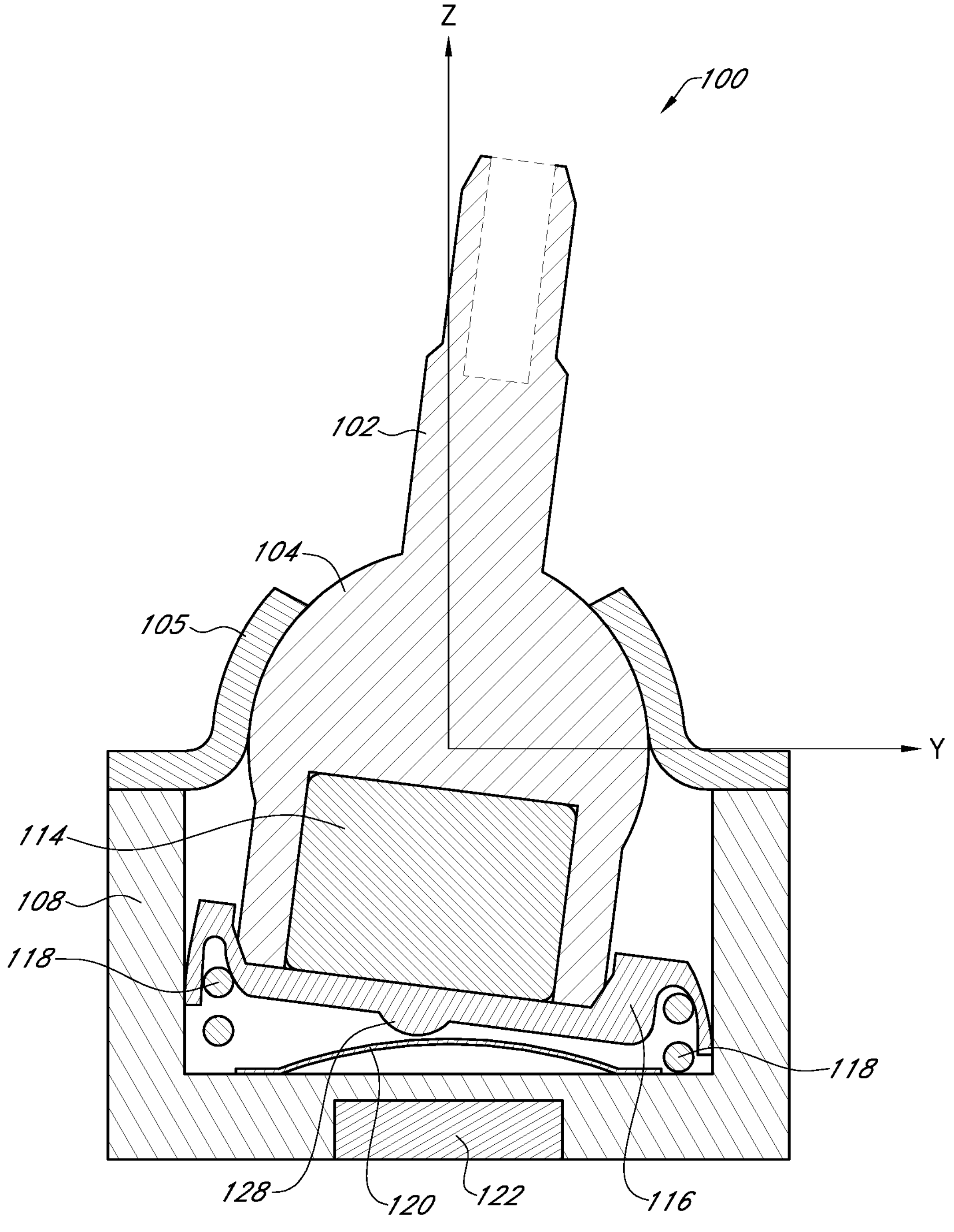
FIG. 6 shows an example joystick operation where the joystick shaft of FIG. 5 is pushed along a Y direction.

FIGS. 5 and 6 show examples of the joystick device 100 accommodating and sensing X and Y joystick motions. Based on such X and Y components, joystick motions in the XY plane can be accommodated and sensed.

FIG. 5 shows an example joystick operation where the shaft 102 is pushed along an X direction. With the ball 104 retained by the pivot cover 105, and pushed against the pivot cover 105 by the spring 118, such a push of the shaft 102 results in the shaft/ball/magnet assembly to rotate about the Y axis. The magnetic field resulting from the tilted orientation can be detected by the sensor 122.

In the example of FIG. 5, the magnet 114 and a portion of the magnet holder (112 in FIG. 4) are shown to engage one side of the spring carrier 116, and the engaged portion of the spring carrier 116 is shown to substantially maintain it structure, while the edge portions of the spring carrier 116 are deformed in a restorable manner to accommodate the tilted orientation of the shaft/ball/magnet assembly. In FIG. 5, the right side of the spring 118 is shown to be compressed to accommodate the example tilted orientation. Thus, when the shaft 102 is released from the tilted orientation, the spring 118 can be restored to its rest position (e.g., where the shaft 102 is along the Z axis, and the ball 104 is pushed against the pivot cover 105).

FIG. 6 shows an example joystick operation where the shaft 102 is pushed along a Y direction. With the ball 104 retained by the pivot cover 105, and pushed against the pivot cover 105 by the spring 118, such a push of the shaft 102 results in the shaft/ball/magnet assembly to rotate about the X axis. The magnetic field resulting from the tilted orientation can be detected by the sensor 122.

In the example of FIG. 6, the magnet 114 and a portion of the magnet holder (112 in FIG. 4) are shown to engage one side of the spring carrier 116, and the engaged portion of the spring carrier 116 is shown to substantially maintain it structure, while the edge portions of the spring carrier 116 are deformed in a restorable manner to accommodate the tilted orientation of the shaft/ball/magnet assembly. In FIG. 6, the right side of the spring 118 is shown to be compressed to accommodate the example tilted orientation. Thus, when the shaft 102 is released from the tilted orientation, the spring 118 can be restored to its rest position (e.g., where the shaft 102 is along the Z axis, and the ball 104 is pushed against the pivot cover 105).

Figure 7:
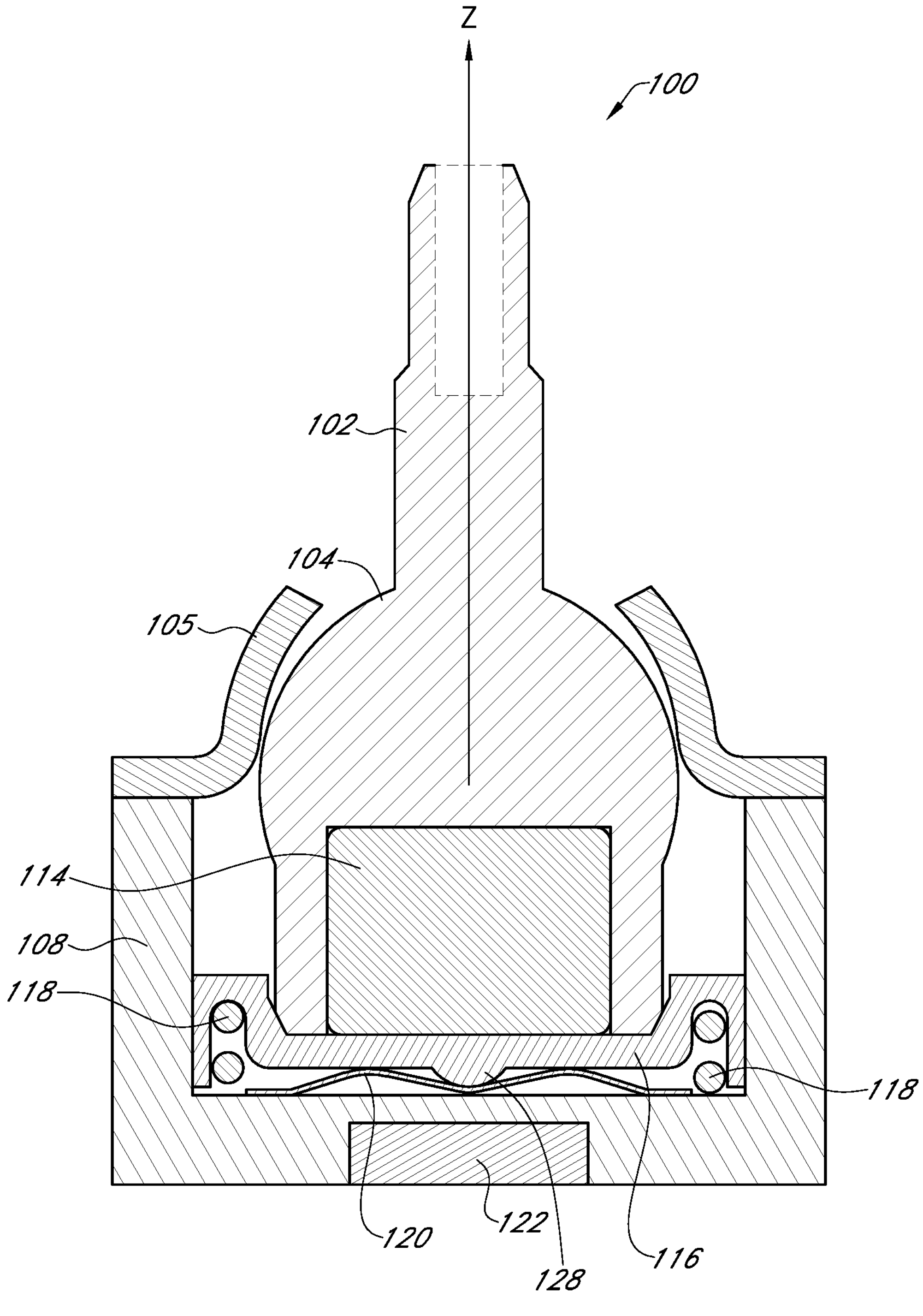
FIG. 7 shows an example joystick operation where the joystick shaft of FIG. 5 is pushed along a Z direction.

FIG. 7 shows an example joystick operation where the shaft 102 is pushed along a Z direction, such that the magnet 114 moves towards the sensor 122. Such a push of the shaft 102 results in the bump structure 128 pushing and deforming the dome structure 120 to provide a click functionality. The magnetic field resulting from the Z-direction pushed orientation can be detected by the sensor 122.

In the example of FIG. 7, the magnet 114 and a portion of the magnet holder (112 in FIG. 4) are shown to engage one side of the spring carrier 116, and the engaged portion of the spring carrier 116 is shown to substantially maintain it structure. In FIG. 7, the spring 118 is shown to be compressed approximately uniformly to accommodate the example pushed orientation. Thus, when the shaft 102 is released from the pushed orientation, the spring 118 can be restored to its rest position (e.g., where the shaft 102 is along the Z axis, and the ball 104 is pushed against the pivot cover 105).

Figure 8:
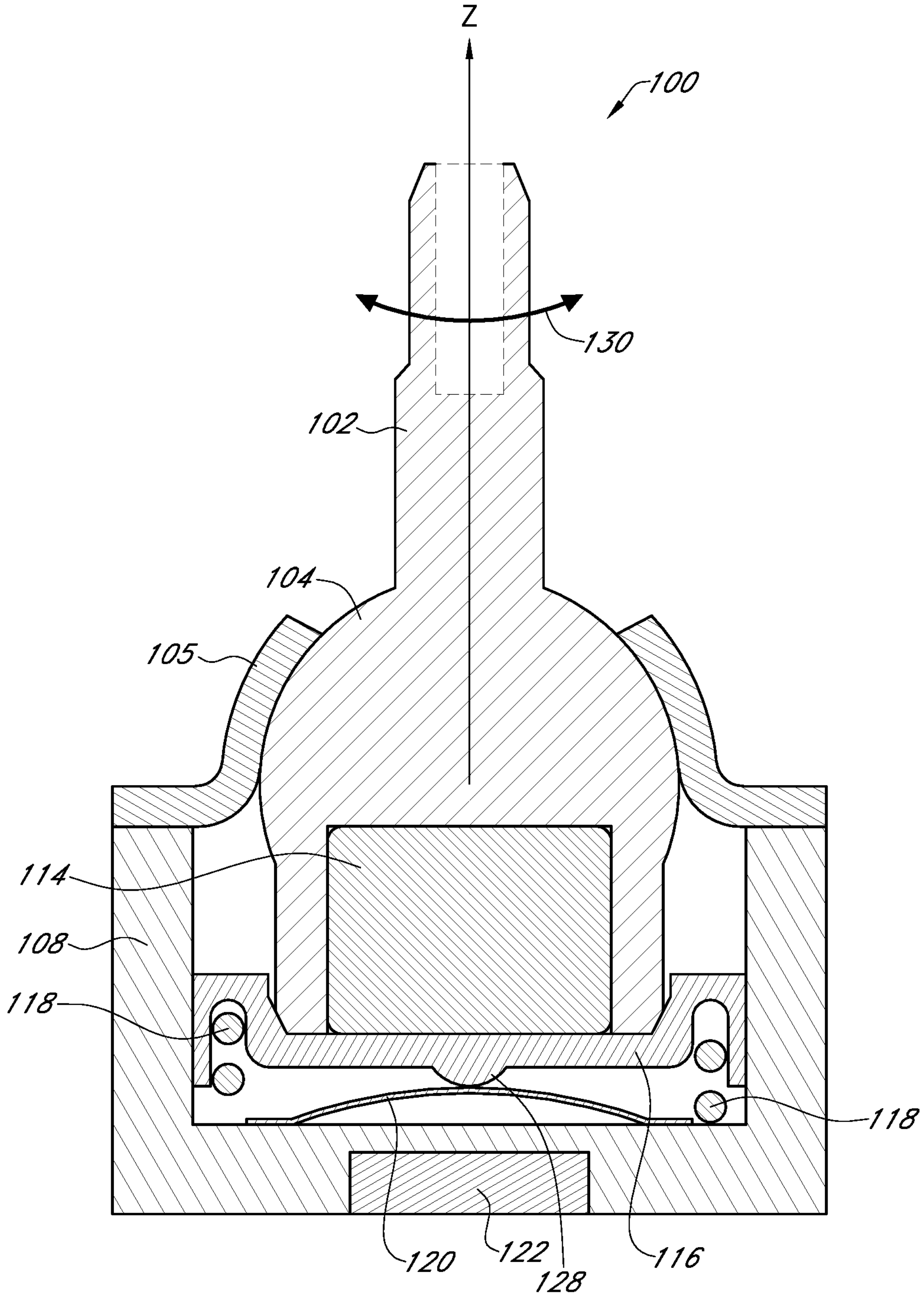
FIG. 8 shows an example joystick operation where the joystick shaft of FIG. 5 is rotated about the Z direction.

FIG. 8 shows an example joystick operation where the shaft 102 is rotated (arrow 130) about a Z direction, such that the magnet 114 rotates relative to the sensor 122. The magnetic field resulting from the foregoing rotation can be detected by the sensor 122.

In the example of FIG. 8, the magnet 114 and a portion of the magnet holder (112 in FIG. 4) are shown to engage one side of the spring carrier 116, and the engaged portion of the spring carrier 116 is shown to substantially maintain it structure. In FIG. 8, the spring carrier 116 can rotate with the magnet 114, partially rotate with the magnet 114, or remain generally fixed rotation-wise. Similarly, the spring 118 can rotate with the magnet 114, partially rotate with the magnet 114, or remain generally fixed rotation-wise. In FIG. 8, the spring 118 can remain in its rest position in terms of compression. In some embodiments, the spring 118 can be configured such that when a rotation of the shaft occurs, the rotated orientation becomes the new rest position. In some embodiments, the spring 118 can be configured such that when a rotation of the shaft occurs, the spring 118 twists in a restorable manner, such that when the shaft is released, the shaft generally returns to the original rest position (by the untwisting spring).

In the examples described herein in reference to FIGS. 2-8, it is generally assumed that the edge portions of the spring carrier (116) is deformable to accommodate the X/Y joystick motions. In such examples, the engagement of the magnet/magnet holder to the spring carrier 116 generally remains during such deformation of the edge portions. It will be understood that such a configuration is an example, and that other configurations of the spring carrier 116 and its engagement to the magnet/magnet holder can also be implemented.

For example, a spring carrier can be configured to not deform at all during the X/Y joystick motions. In some embodiments, such a configuration can be implemented with an appropriate overall lateral dimension of the spring carrier, such that the edges of the spring carrier does not interfere with the tilting joystick motions.

In another example, a spring carrier does not necessarily need to remain fully engaged with the magnet/magnet holder assembly during the X/Y joystick motions. By way of an example, a portion of the magnet/magnet holder assembly can remain engaged with the spring carrier, while another portion of the magnet/magnet holder assembly disengages from the spring carrier during a tilted joystick orientation.

In the various examples of FIGS. 5-8, the X, Y, Z and rotational joystick motions are depicted and described individually for clarity. It will be understood that a joystick device having one or more features as described herein can simultaneously accommodate and sense some or all of such joystick motions.

Figure 9:
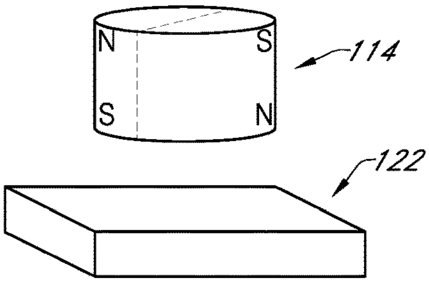
FIG. 9 shows that in some embodiments, a magnet and a sensor can be utilized to support some or all of the control examples of FIGS. 2-8.

FIG. 9 shows that in some embodiments, the magnet 114 of the examples of FIGS. 2-8 can be a diametrically-magnetized disc magnet 114 positioned relative to the corresponding sensor 122. In FIG. 9, the magnet 114 is shown without the magnet holder, and the sensor 122 is shown without the housing; however, it will be understood that the relative orientation of the magnet 114 and the sensor 122 can be facilitated by the magnet holder and the housing as described herein.

Figure 10:
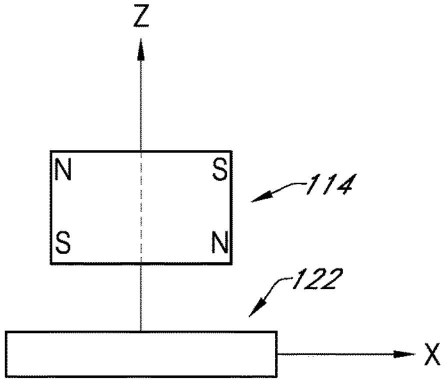
FIG. 10 shows a side view of the magnet/sensor arrangement of the example of FIG. 9.

FIG. 10 shows a side view of the magnet/sensor arrangement of the example of FIG. 9. FIG. 10 also shows an example of how X, Y and Z directions can be defined with respect to the magnet 114 and the sensor 122. For example, the diametrically-splitting plane of the magnet 114 can be approximately parallel with the ZY plane. In such a configuration, the sensor 122 as a whole can define a plane that is approximately parallel with the XY plane.

Figure 11:
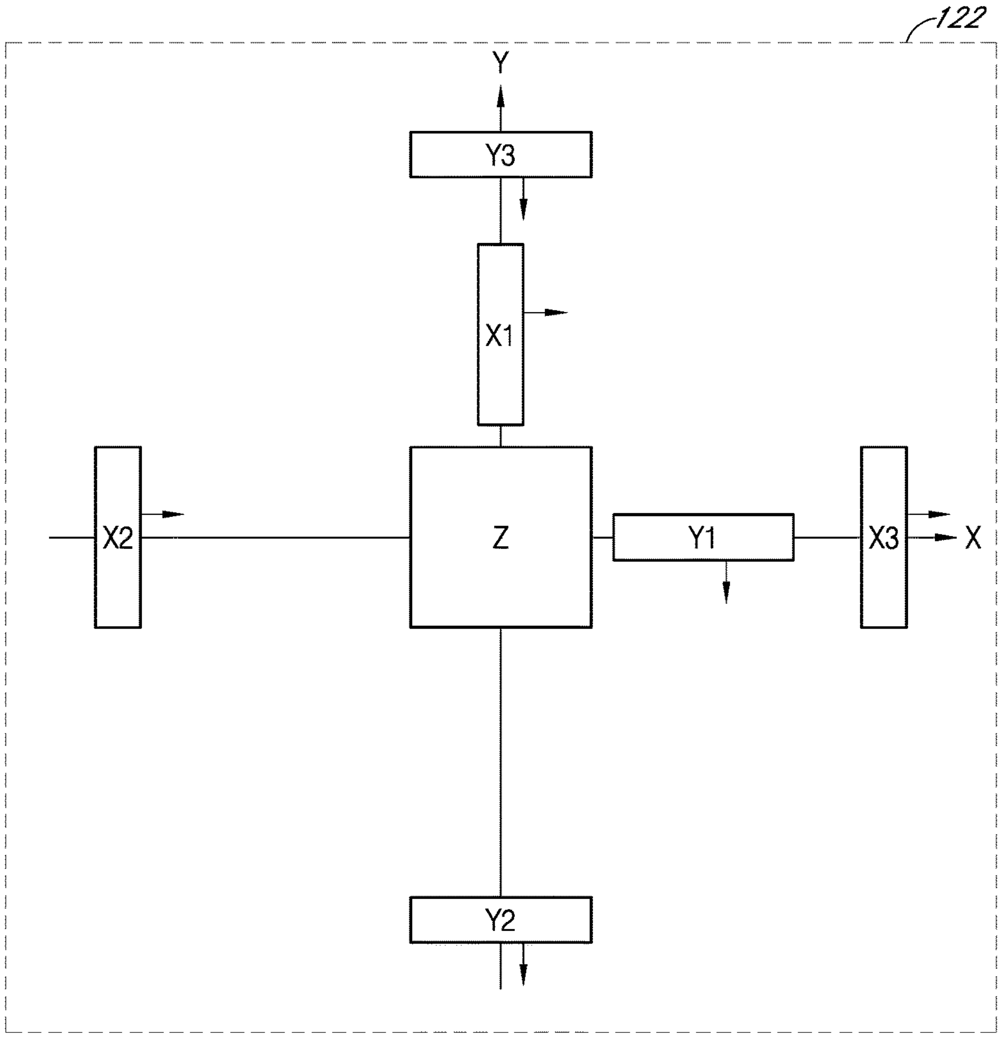
FIG. 11 shows that in some embodiments, the sensor of FIGS. 9 and 10 can be a sensor having multiple Hall-effect sensing elements.

FIG. 11 shows that in some embodiments, the sensor 122 of the examples of FIGS. 2-10 can be a sensor 122 having multiple Hall-effect sensing elements. In FIG. 11, such a sensor is depicted as viewed along the Z axis, such that the various Hall-effect sensing elements are positioned on the XY plane of the sensor 122.

In the example of FIG. 11, the tilt of the magnet (114 in FIG. 10) resulting from the X-direction joystick motion (e.g., as in FIG. 5) can be detected by Hall-effect sensing elements X1, X2 and X3. Each of such Hall-effect sensing elements can be oriented to have its normal face facing the direction indicated by the respective arrow (e.g., to the right in FIG. 11). Similarly, the tilt of the magnet resulting from the Y-direction joystick motion (e.g., as in FIG. 6) can be detected by Hall-effect sensing elements Y1, Y2 and Y3. Each of such Hall-effect sensing elements can be oriented to have its normal face facing the direction indicated by the respective arrow (e.g., to the bottom in FIG. 11).

In the example of FIG. 11, the variation in separation distance (between the magnet 114 and the sensor 122 in FIG. 10) resulting from the Z-direction joystick motion (e.g., as in FIG. 7) can be detected by one or more Hall-effect sensing elements collectively indicated as Z. Such Z sensing element(s) can have its normal face facing a direction along the Z axis.

In some embodiments, the Z sensing element can also be configured to sense the rotational joystick motion (e.g., as in FIG. 8). Among others, examples related to such sensing of angular position of a diametrically-magnetized disc magnet can be found in U.S. Pat. No. 9,593,967 titled HIGH-RESOLUTION NON-CONTACTING MULTI-TURN SENSING SYSTEMS AND METHODS, which is expressly incorporated by reference in its entirety, and its disclosure is to be considered part of the specification of the present application.

In some embodiments, a sensor (e.g., 122 in FIG. 11) having one or more features as described herein can include a 3-D Linear Hall-Effect Sensor (e.g., model ALS31300) available from Allegro MicroSystems, LLC.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A control input device comprising:

a housing defining an inner volume with a floor;

a shaft having a manipulating portion and a sensing end;

a magnet mounted on the sensing end of the shaft, such that the magnet is within the inner volume of the housing;

a movement mechanism including a pivot cover having an opening and positioned over the inner volume of the housing, the movement mechanism further including a ball implemented towards the sensing end of the shaft, the ball including a portion attached to the shaft and extends out of the pivot cover, a portion that movably engages the pivot cover, and a portion that receives a spring force to maintain the ball captured by the pivot cover while allowing a movement of the magnet resulting from a movement of the manipulating portion of the shaft to be moved with respect to the housing; and a magnetic sensor at least partially embedded in the floor of the housing and configured to sense the movement of the magnet.

2. The control input device of claim 1 wherein the control input device is implemented as a joystick.

3. The control input device of claim 1 wherein the movement mechanism further includes a spring having a first end positioned on the floor and a second end coupled to the portion of the ball receiving the spring force.

4. The control input device of claim 3 wherein the portion of the ball receiving the spring force defines a recess dimensioned to receive the magnet.

5. The control input device of claim 4 wherein the movement mechanism further includes a spring carrier that provides the coupling of the second end of the spring to the portion of the ball receiving the spring force, the spring carrier having a first side and a second side, the first side configured to engage either or both of the magnet and the portion of the ball receiving the spring force, the second side configured to capture the second end of the spring such that the spring force provided by the spring is transferred to the ball through the spring carrier.

6. The control input device of claim 5 wherein the magnet has a disc shape, and the recess of the third portion of the ball receiving the spring force has a depth dimension such that both of the magnet and the third portion of the ball receiving the spring force engage the first side of the spring carrier.

7. The control input device of claim 5 further comprising a dome structure implemented between the spring carrier and the floor of the housing, the dome structure configured to deform and provide a click noise and/or feel when the shaft is pushed towards the floor of the housing.

8. The control input device of claim 7 wherein the spring carrier includes a bump structure implemented on its second side to facilitate the deformation of the dome structure.

9. The control input device of claim 1 wherein the movement of the magnet includes a rotation about a longitudinal axis of the shaft.

10. The control input device of claim 9 wherein the magnet is configured as a diametrically-magnetized disc magnet.

11. The control input device of claim 1 wherein the magnetic sensor includes multiple Hall-effect sensing elements arranged to sense the movement of the magnet.

12. The control input device of claim 1 wherein the magnet and the magnetic sensor are in a non-contacting arrangement.

13. The control input device of claim 1 wherein the magnetic sensor is at least partially embedded on an outer side of the floor of the housing.

14. A control input device comprising:

a housing defining an inner volume with a floor;

a shaft having a manipulating portion and a sensing end;

a magnet mounted on the sensing end of the shaft, such that the magnet is within the inner volume of the housing;

a movement mechanism including a pivot cover having an opening and positioned over the inner volume of the housing, the movement mechanism further including a ball implemented towards the sensing end of the shaft, the ball including a portion attached to the shaft and extends out of the pivot cover, a portion that movably engages the pivot cover, and a portion that receives a spring force to maintain the ball captured by the pivot cover while allowing a movement of the magnet resulting from a movement of the manipulating portion of the shaft with respect to the housing; and a magnetic sensor at least partially embedded in the floor of the housing and configured to sense the movement of the magnet, wherein the movement of the magnet includes a direction having one or more components parallel with an X direction, a Y direction, and a Z direction, the Z direction being parallel with a longitudinal axis of the shaft, the X, Y and Z directions being orthogonal with respect to each other.

15. A control input device of claim 13 comprising:

a housing defining an inner volume with a floor;

a shaft having a manipulating portion and a sensing end;

a magnet mounted on the sensing end of the shaft, such that the magnet is within the inner volume of the housing;

a movement mechanism including a pivot cover having an opening and positioned over the inner volume of the housing, the movement mechanism further including a ball implemented towards the sensing end of the shaft, the ball including a portion attached to the shaft and extends out of the pivot cover, a portion that movably engages the pivot cover, and a portion that receives a spring force to maintain the ball captured by the pivot cover while allowing a movement of the magnet resulting from a movement of the manipulating portion of the shaft with respect to the housing; and a magnetic sensor configured to sense the movement of the magnet and substantially embedded in the floor such that an exposed surface of the magnetic sensor is approximately flush with an outer side of the floor of the housing.

16. A method for manufacturing a control input device, the method comprising:

forming or providing a housing having an inner volume with a floor;

forming or providing a shaft having an axis, a manipulating portion, and a sensing end;

mounting a magnet on the sensing end of the shaft;

assembling a movement mechanism with respect to the housing and the shaft, such that the movement mechanism allows the manipulating portion of the shaft to be moved with respect to the housing, and the movement of the manipulating portion results in corresponding movement of the magnet within the inner volume of the housing, and such that the movement mechanism includes a pivot cover having an opening and positioned over the inner volume of the housing, the movement mechanism further including a ball implemented towards the sensing end of the shaft, the ball including a portion attached to the shaft and extends out of the pivot cover, a portion that movably engages the pivot cover, and a portion that receives a spring force to maintain the ball captured by the pivot cover while allowing the movement of the magnet; and mounting a magnetic sensor to be at least partially embedded in the floor of the housing to allow sensing of the movement of the magnet.

17. The method of claim 16 wherein the mounting of the magnetic sensor includes mounting the magnetic sensor to be at least partially embedded on an outer side of the floor of the housing.

18. A method for manufacturing a control input device, the method comprising:

forming or providing a housing having an inner volume with a floor;

forming or providing a shaft having an axis, a manipulating portion, and a sensing end;

mounting a magnet on the sensing end of the shaft;

assembling a movement mechanism with respect to the housing and the shaft, such that the movement mechanism allows the manipulating portion of the shaft to be moved with respect to the housing, and the movement of the manipulating portion results in corresponding movement of the magnet within the inner volume of the housing; and mounting a magnetic sensor to be embedded in the floor of the housing to allow sensing of the movement of the magnet, wherein the magnetic sensor is embedded in the floor such that an exposed surface of the magnetic sensor is approximately flush with an outer side of the floor of the housing.

* * * * *